(12) United States Patent
Heinrichs

(10) Patent No.: US 7,743,460 B2
(45) Date of Patent: Jun. 29, 2010

(54) DUST SUCTION DEVICE

(75) Inventor: Viktor Heinrichs, Untermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 230 days.

(21) Appl. No.: 11/820,593

(22) Filed: Jun. 19, 2007

(65) Prior Publication Data

US 2007/0294857 A1 Dec. 27, 2007

(30) Foreign Application Priority Data

Jun. 26, 2006 (DE) .................... 10 2006 000 310

(51) Int. Cl.
*A47L 9/10* (2006.01)
(52) U.S. Cl. .................................. 15/352; 15/347
(58) Field of Classification Search .................. 15/347, 15/350–352; 55/337, 347, 428, 429, 299, 55/300, DIG. 3
See application file for complete search history.

(56) References Cited

U.S. PATENT DOCUMENTS

| | | | |
|---|---|---|---|
| 4,830,642 A * | 5/1989 | Tatge et al. ................. 96/426 |
| 5,814,114 A * | 9/1998 | Stueble ...................... 55/284 |
| 7,318,249 B2 * | 1/2008 | Lin ............................ 15/352 |
| 7,351,269 B2 * | 4/2008 | Yau ........................... 55/297 |
| 2005/0000055 A1 * | 1/2005 | Cheng ........................ 15/352 |

\* cited by examiner

*Primary Examiner*—Dung Van Nguyen
(74) *Attorney, Agent, or Firm*—Abelman, Frayne & Schwab

(57) ABSTRACT

A dust suction device (2), particularly in the form of an industrial vacuum cleaner, has a blower device (6) for generating an intake flow (S), a filter surface (16) for separating dust and dirt particles from the intake flow (S), a collecting chamber (18) for collecting the dust and the dirt particles which is located upstream of the filter surface (16) with respect to the intake flow (S), a clean air chamber (20) which is arranged downstream of the filter surface (16) and is separated from the collecting chamber (18) by the filter surface (16), with the filter surface (16) being acted upon in some areas by a cleaning flow of the blower device (6) which flows through the filter surface (16) in the direction opposite the direction of the intake flow (S), and an adjustable dividing wall (30) provided in the clean air chamber (20) and separating a vacuum area (40) that can be generated by the blower device (6) from an overpressure area (38) that can likewise be generated by the blower device (6).

10 Claims, 3 Drawing Sheets

DUST SUCTION DEVICE

BACKGROUND OF THE INVENTION

1. Field of the Invention

The invention related to a dust suction device, particularly in the form of an industrial vacuum cleaner, with a blower device for generating an intake flow. Further, the dust suction device has a filter surface for separating dust and dirt particles from the intake flow. A collecting chamber for collecting the dust and the dirt particles is arranged downstream of the blower device, in the direction of the intake flow and upstream of the filter surface, and a clean air chamber is arranged downstream of the filter surface and is separated from the collecting chamber by the filter surface. The filter surface can be acted upon in some areas by a cleaning flow of the blower which flows through the filter surface in the direction opposite the intake flow direction for cleaning by back-blowing.

2. Description of the Prior Art

In devices of the type mentioned above, the filter surface can be back-flushed by the cleaning flow in order to rid the filter surface of adhering dust particles and dirt particles which cause the filter surface to be clogged and accordingly reduce the suction capacity of the dust suction device.

German Publication DE 37 33 255 A1 discloses a bag filter dust collector which has a plurality of bag filters in a housing. To remove dust, air is sucked into the bag filters. In addition, a reverse flow of cleaning air can be blown into the bag filters by blowing pipes. By simultaneously generating a vacuum pressure in some of the bag filters and blowing a reverse cleaning air flow into the other bag filters, the latter can be rid of adhering dust by back-flushing.

In this way all of the bag filters can be cleaned without allowing the blown-back air with a high dust content to exit outward. Accordingly, there is no dust discharged to the environment when cleaning the bag filters.

The known procedure is disadvantageous in that it can only be applied in dust suction devices having at least two filter elements, wherein one filter surface is blown clear, while the other is required for sucking in the dust particles and dirt particles that are disengaged. In addition, the blowing pipes require relatively extensive additional installation space and appreciably increase manufacturing costs.

SUMMARY OF THE INVENTION

It is the object of the present invention to overcome the above-mentioned disadvantages in a dust suction device and to enable a simple cleaning of the filter surface in which the least possible additional installation space is required and which is also suitable for dust suction devices with one individual filter element.

This and other objects of the present invention, which will become apparent hereinafter, are achieved, according to the invention, in that an adjustable dividing wall is provided in the clean air chamber, which adjustable dividing wall separates a vacuum area that can be generated by the blower device from an overpressure area that can likewise be generated by the blower device within the clean air chamber. In this way, partial areas of the filter surface can serve to separate dust and dirt particles from the intake flow, while other partial areas of the filter surface are simultaneously rid of adhering particles by back-blowing by means of the blower device, regardless of whether the filter surface is formed by an individual filter element or a plurality of filter elements. The respective partial areas of the filter surface can be changed by the ability to adjust the dividing wall which makes it possible to gradually clean the entire filter surface.

In a particularly preferred embodiment form, the dividing wall is formed by a slide element which makes possible an easy adjustment of the dividing wall and the overpressure area and vacuum area, respectively.

The slide element is advantageously displaceable automatically along at least approximately the entire filter surface so that the entire filter surface can be cleaned automatically during operation. This ensures a maximum degree of cleanness of the filter surface at all times without requiring regular maintenance by the user.

The displacement is preferably carried out by means of a drive device which can be activated by an air flow that can be generated by the blower device. In this way, the blower device can also drive the slide element simultaneously. Accordingly, on the one hand, there is no need for a dedicated motor for the displacement of the slide element and, on the other hand, a proportional adjusting speed of the slide element can be achieved, for example, depending on the strength of the intake flow.

In a particularly advantageous embodiment, the clean air chamber is cylindrical, and the slide element is formed by a rotary slide which is movable in the clean air chamber. In this way, the elements required for back-blowing the filter surface can be constructed in a particularly compact manner so that the required additional installation space is minimized.

The clean air chamber is advantageously bounded by a cylindrical filter element which forms the filter surface. The overpressure area and the vacuum area can accordingly be generated inside an individual filter element. In this way, all of the elements required for back-blowing the filter surface can easily be accommodated in the dust suction device without requiring additional installation space.

The cylindrical filter element preferably presents a zigzag line in cross-section and the slide element has a flexible sealing element which extends from the slide element to the filter element. Accordingly, when the slide element moves, the flexible sealing element repeatedly strikes against the filter element having the zigzag shape in cross-section so that the cleaning capacity can be appreciably increased.

Alternatively, the clean air chamber is formed at least partially by a cylindrical antechamber which has a first flow connection to a first filter element and at least one additional flow connection to another filter element. Accordingly, in a dust suction device with a plurality of filters, the filter element that is acted upon by overpressure and the filter element that is acted upon by vacuum pressure can be selected in a particularly simple manner.

The rotary slide is advantageously V-shaped so that a certain segment of the cylindrical clean air chamber in which the overpressure area can be formed for back-blowing the filter surface can be separated from the rest of the clean air chamber in a particularly efficient manner.

It is particularly advantageous when the V-shaped rotary slide extends over a covering angle of from 30° to 90° so that the ratio resulting between the filter surface used for separation and the filter surface which is back-blown simultaneously is particularly suitable for normal operation. An approximately constantly high separating capacity can be ensured in this way over a long operating period.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
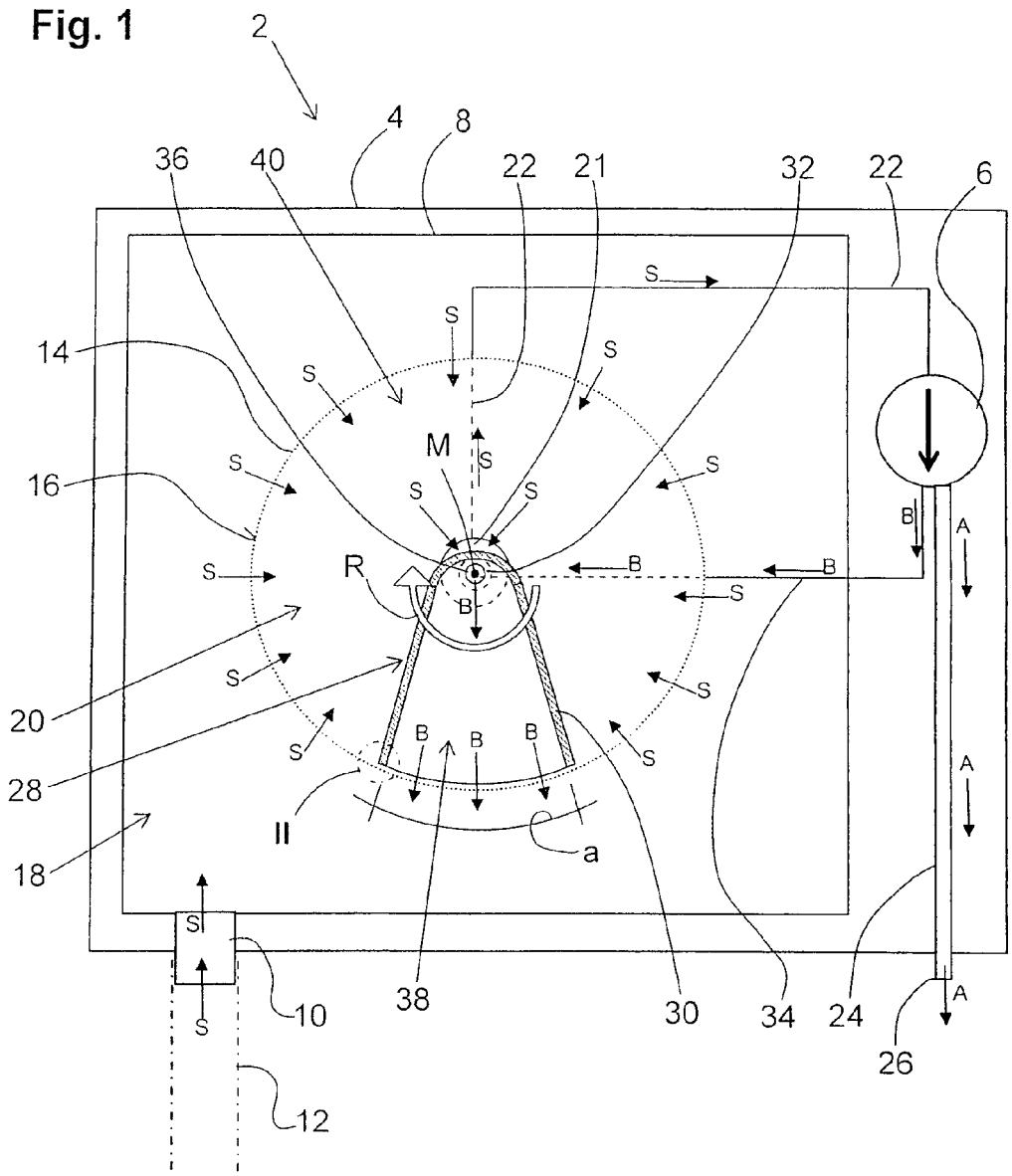
FIG. 1 a schematic view of a dust suction device according to the invention with an individual filter element.

FIG. 1 shows a basic schematic view of a dust suction device 2 in the form of an industrial vacuum cleaner. It has a blower device 6 in a main housing 4 and has an inner housing 8. Further, an intake connection piece 10 is provided at the main housing 4 to which, for example, a pipe-shaped or hose-shaped suction element 12 can be connected and which opens into the inner housing 8.

A filter element 14 having a substantially cylindrical filter surface 16 is held in the inner housing 8. The filter element 14 serves to separate dust and dirt particles from an intake flow, indicated by arrows S, which is generated by the blower device 6 at the suction element 12. The intake flow S flows from the suction element 12 via the intake connection piece 10 into the inner housing 8 and through the filter surface 16 into the interior of the filter element 14. The inner housing 8 forms a collecting chamber 18 for the retained dust and the dirt particles, this collecting chamber 18 being separated by the filter element 14 from a clean air chamber 20 in its interior. The intake flow S which has been cleaned passes from this clean air chamber 20 through an intake opening 21 and a suction line 22 to the blower device 6. A portion of the cleaned air is discharged into the atmosphere as a blow-off flow A via a blow-off line 24 and a blow-off opening 26.

Further, a slide element 28 with a dividing wall 30 which is V-shaped in section is provided in the interior of the filter element 14. This slide element 28 extends along a covering angle a of from 30° to 90° and a corresponding sector of the filter surface 16. The slide element 28 is swivelable around a center axis M of the filter element 14 by a drive device 32, only shown schematically, along a swiveling direction R.

The drive device 32 is driven via a blowing air line 34 by a blowing air flow, indicated by arrows B, which is generated by the blower device 6. This blowing air flow B enters the interior of the slide element 28 via a central inlet opening 36 and forms an overpressure area 38 therein. This overpressure area 38 is separated by the V-shaped dividing wall 30 from the rest of the clean air chamber 20 in which a vacuum area 40 is formed owing to the intake flow S.

As a result, there is a flow through the filter surface 16 from the inside to the outside in the area of the covering angle a in the reverse direction with respect to the rest of the filter surface 16. A portion of the filter surface 16 is accordingly back-blown simultaneously during the suction operation of the dust suction device 2, and the filter element 14 is freed from adhering dust particles and dirt particles which are retained in the collecting chamber 18.

The slide element 28 is swiveled continuously around the center axis M by the drive device 32 so that the filter element 14 is cleaned continuously over its entire filter surface 16 during operation.

Figure 2:
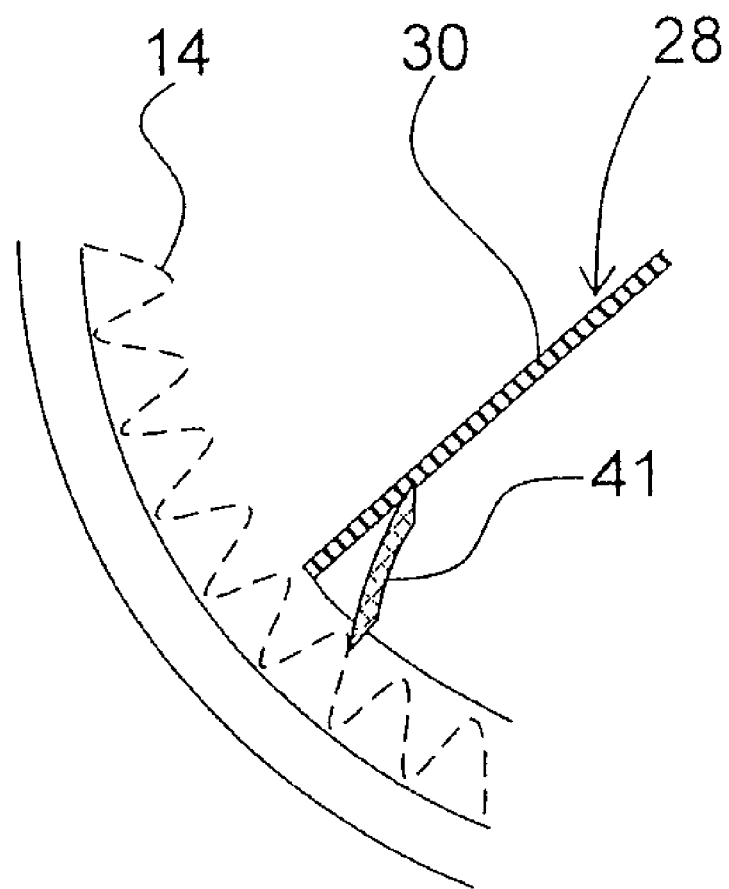
FIG. 2 a view showing a sealing area between the filter element and a slide element according to detail II from FIG. 1.

FIG. 2 shows a possible embodiment form of the sealing area between the filter element 14 and the slide element 28 in detail. The filter element 14 forms a zigzag line in section. A flexible sealing element 41, for example, in the form of a rubber lip, is held at the dividing wall 30 and seals the intermediate chamber between the dividing wall 30 and the filter element 14. During the movement of the slide element 28 in the swiveling direction R, this sealing element 41 strikes against successive profile vertices formed by the zigzagging filter element 41 and accordingly generates shaking or vibrations which further increase the cleaning effect during back-blowing.

Figure 3:
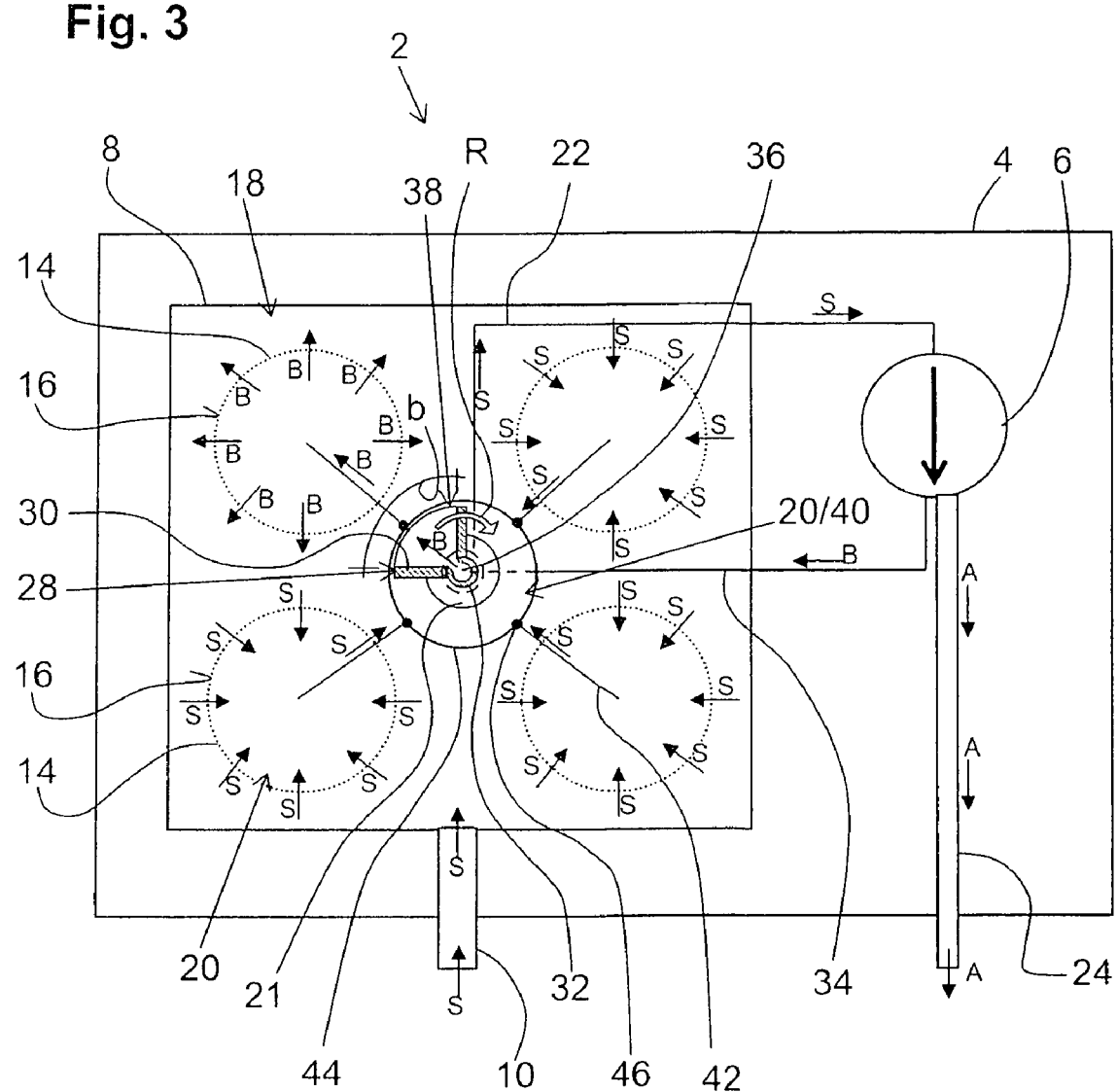
FIG. 3 a schematic view of an alternative embodiment of a dust suction device according to the invention with four filter elements.

In the alternative embodiment of the dust suction device 2 according to FIG. 3, elements having the identical function are designated by the same reference numbers used in FIG. 1.

The embodiment according to FIG. 3 differs from the embodiment according to FIG. 1 substantially in that the dust suction device 2 now has a plurality of filter elements 14. All of the filter elements 14 are connected with respect to flow to a cylindrical antechamber 44 via a connection line 42 so that this antechamber 44 forms a common clean air chamber 20 together with the inner chambers of the filter elements 16.

The slide element 28 which is again formed as a rotary slide is now arranged in the antechamber 44 so as to be rotatable and extends over a covering angle b. This corresponds to an angular distance between connection points 46 of the connection lines 42 at the antechamber 44 of, for example, 45° as is shown. The slide element 28 accordingly covers one of the connection points 46 in every swiveling position so that the connection line 42 in question is acted upon by the blowing air flow B acting as cleaning flow via the blowing air line 34 coming from the blower device 6. In this way, the blowing air flows through the entire filter element 14 in question from the inside to the outside.

On the other hand, for separating out dust and direct particles from the intake flow S, the rest of the filter elements 14 are connected to the rest of the portion of the antechamber 44 that communicates with the blower device 6 via the intake opening 21 and the suction line 22. This blower device 6 generates the intake flow S which now flows from the intake connection piece 10 into the collecting chamber 18 formed by the inner housing 8 and from the latter through the filter surface 16 of the three relevant filter elements 14 into their interior. The air which is now cleaned flows from the latter via the connection lines 42 into the antechamber 44 and then to the blower device 6 via the intake opening 21 and the suction line 22.

The blower device 6 then discharges the cleaned air as blow-off flow A to the atmosphere via the blow-off line 24 and the blow-off opening 26 or blows a portion into the area of the antechamber 44 covered by the slide element 28 as blowing air flow B via the blowing air line 34 and the inlet opening 36. Accordingly, the V-shaped dividing wall 30 of the slide element 28 again divides the overpressure area 38 occurring inside the slide element 28 from the vacuum area 40 occurring in the rest of the antechamber 44. In addition, a drive device 32 which automatically swivels the slide element 28 in swiveling direction R can also be provided in this case so that gradually each of the filter elements 14 is acted upon by the blowing air flow B acting as cleaning flow and adhering dust and dirt are accordingly discharged into the collecting chamber 18.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A dust suction device (2), comprising a blower device (6) for generating an intake flow (S); a filter surface (16) for separating dust and dirt particles from the intake flow (S); a collecting chamber (18) for collecting the dust and the dirt particles which is arranged upstream of the filter surface (16) in a direction of the intake flow (S); a clean air chamber (20) which is arranged downstream of the filter surface (16) and is separated from the collecting chamber (18) by the filter surface (16), wherein the filter surface (16) can be acted upon in some areas by a cleaning flow of the blower device (6) which flows through the filter surface (16) in a direction opposite the direction of the intake flow (S); and an adjustable dividing wall (30) provided in the clean air chamber (20) and separating a vacuum area (40) that can be generated by the blower device (6), from an overpressure area (38) that can likewise be generated by the blower device (6).

2. A dust suction device according to claim 1, wherein the dividing wall (30) is formed by a slide element (28).

3. A dust suction device according to claim 2, wherein the slide element (28) is displaceable automatically along approximately an entire filter surface (16).

4. A dust suction device according to claim 3, wherein the displacement is carried out by means of a drive device (32) which can be activated by an air flow that can be generated by the blower device.

5. A dust suction device according to claim 2, wherein the clean air chamber (20) is cylindrical, and the slide element (28) is formed by a rotary slide movable in the clean air chamber.

6. A dust suction device according to claim 5, wherein the clean air chamber (20) is bounded by a cylindrical filter element (14) which forms the filter surface (16).

7. A dust suction device according to claim 6, wherein the cylindrical filter element (14) presents a zigzag line in cross-section, and the slide element (28) has a flexible sealing element (41) which extends from the slide element (28) to the filter element (14).

8. A dust suction device according to claim 5, wherein the clean air chamber (20) is formed at least partially by a cylindrical antechamber (44) which has a first flow connection to the filter element (14), and at least one additional flow connection to another filter element (14).

9. A dust suction device according to claim 5, wherein the rotary slide is V-shaped.

10. A dust suction device according to claim 9, wherein the V-shaped rotary slide extends over an angle from 30° to 90°.

* * * * *